J. F. HAWORTH.
CAMERA.
APPLICATION FILED SEPT. 27, 1917.

1,277,919.

Patented Sept. 3, 1918.
2 SHEETS—SHEET 1.

WITNESSES

INVENTOR
J. F. Haworth

J. F. HAWORTH.
CAMERA.
APPLICATION FILED SEPT. 27, 1917.
1,277,919.
Patented Sept. 3, 1918.
2 SHEETS—SHEET 2.
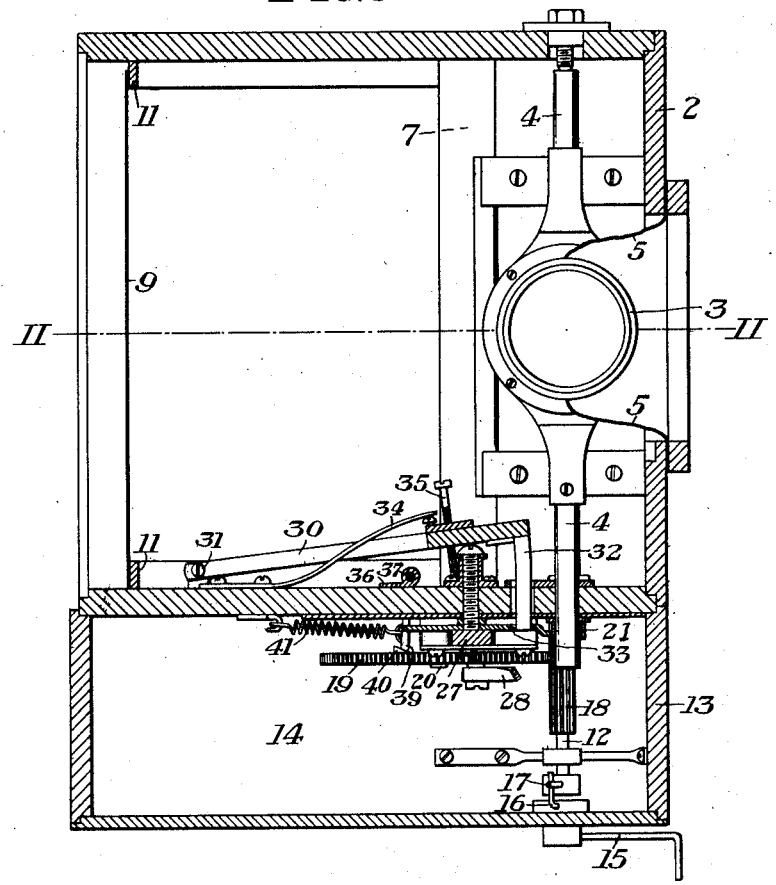
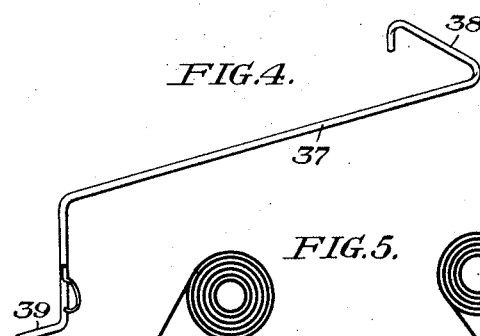
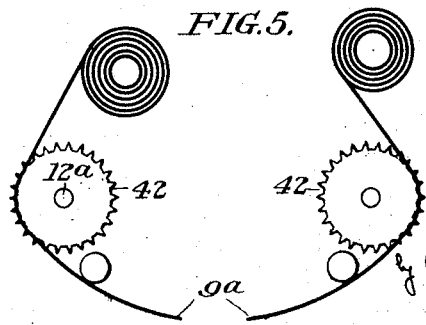
WITNESSES
INVENTOR

UNITED STATES PATENT OFFICE.

JEHU FREDERIC HAWORTH, OF EDGEWORTH, PENNSYLVANIA.

CAMERA.

1,277,919.  Specification of Letters Patent.  Patented Sept. 3, 1918.

Application filed September 27, 1917. Serial No. 193,502.

*To all whom it may concern:*

Be it known that I, JEHU FREDERIC HAWORTH, a citizen of the United States, residing at Edgeworth, Allegheny county, Pennsylvania, have invented a new and useful Improvement in Cameras, of which the following is a full, clear, and exact description, reference being had to the accompanying drawings, forming part of this specification, in which—

Fig. 3 is a sectional view on the line III—III of Fig. 2.

Fig. 4 is a perspective view of portions of the locking mechanism, and

Fig. 5 is a diagram illustrating the movement of a film across the usual feed rollers for a moving picture machine.

Figure 1:
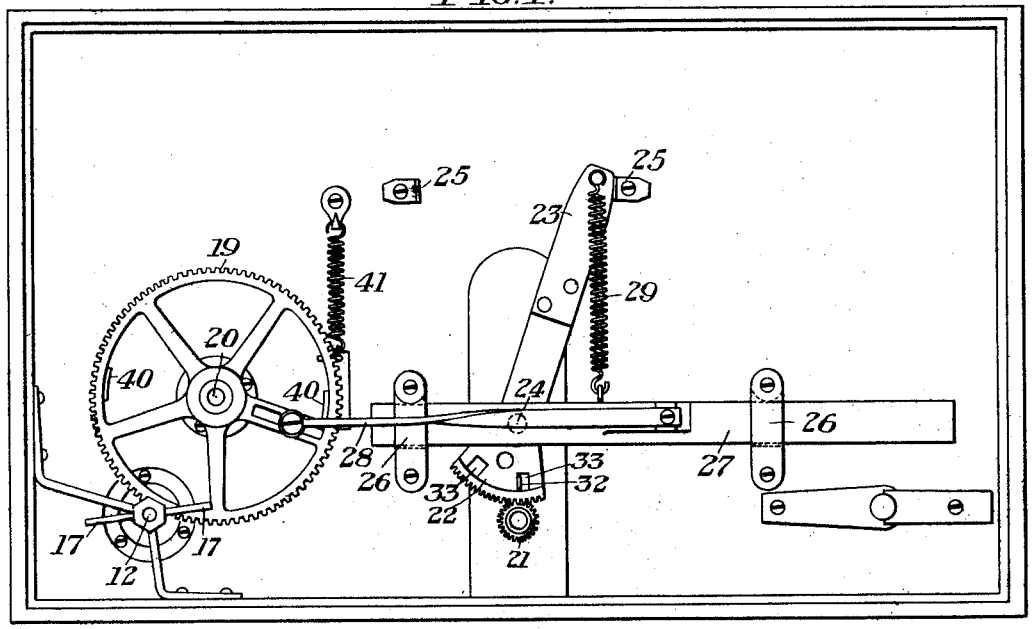
Figure 1 is an end view of a camera with the cover removed for clearness.

This invention relates to an improvement in cameras, and is designed to provide a cheap and efficient lens swinging mechanism and film shifting mechanism for panoramic cameras.

Another object of this invention is to provide mechanism which will cause the lens to periodically sweep across the film after the film has been shifted a predetermined distance to make an exposure on the portion of the film which has just been moved across the path of the lens and to then lock the lens during the movement of the film for the next exposure.

The precise nature of my invention will be best understood by reference to the accompanying drawings, which will now be described, it being premised, however, that various changes may be made in the details of construction and the general arrangement of the parts, without departing from the spirit and scope of my invention, as defined in the appended claims.

Referring to the accompanying drawings, the reference character 2 designates the box of the camera, having a lens frame 3 connected to spindles 4. These spindles are rotatably mounted in journals in the camera, and one of which is positively actuated to cause the lens frame to sweep across the film as hereinafter described. The front of the lens frame is connected to the box of the camera by means of a flexible diaphragm member 5, and which closes the opening in the box of the camera through which the lens swings.

Rotatably mounted in recesses 7 in the box of the camera are the film spools 8, the film 9 passes from one spool to the other over the idle rollers 10. The film is guided in a circular path from one spool to the other over curved guides 11, that portion of the film between the guides 11 and the recesses 7 is exposed when the lens frame is swung across the face of the film.

The shaft of one of the spools 8 is connected to an actuating shaft 12, which has a clutch connection in the casing 13, for permitting the shaft to be freely moved in one direction, but preventing its movement in the reverse direction. The operating mechanism for the various parts is in a compartment 14, separate from the compartment containing the film, and which compartment is also light proof. The shaft 12 is arranged to be actuated by a crank 15 having a stem rotatably mounted in a bearing in a cover to the compartment 14, and which crank is provided with projections 16 for engaging projections 17 on the shaft 12. 18 is a pinion on the shaft 12 which meshes with a gear wheel 19, rotatably mounted on a stud shaft 20, and which gear wheel is arranged to extend a spring for swinging the lens frame.

Connected to one of the spindles 4 of the lens frame and within the compartment 14 is a pinion 21 which meshes with the teeth of a sector 22 on the end of a lever 23, and which is pivoted at 24 to the position between the compartment 14 and the film compartment. 25 are stops for the end of the lever 23 for determining the movement thereof about its pivot 24. Slidably mounted in guides 26 is a slide 27, which is arranged to slide over the pivotal connection 24 of the lever 23. 28 is a connecting rod adjustably connected to the gear wheel 19 and the slide 27, and which is arranged to reciprocate this slide when the shaft 12 is operated. Connected to the central portion of this slide and a pin on the end of the lever 23 is a spring 29, which is arranged to throw the lever 23 from one position to the other position to oscillate the lens frame.

The arrangement of the devices are such that for each revolution of the gear wheel 19, the slide 27 will be moved back and forth, and consequently shift the lens carrier twice.

In order to retain the lever 23 in its extreme positions during the movement of the slide 27, I provide a locking device for locking it in its extreme positions after it has been thrown. This locking device comprises a lever 30 pivoted at 31, the end of the lever 30 having a projection 32 which is arranged to enter either of the openings 33 in the end of the lever 23. This lever 30 is held in its locking position by means of a leaf spring 34, and the movement thereof in the locking direction is determined by a stop screw 35. Mounted in bearings 36 is a rock shaft 37, having a projection 38 arranged to engage the lever 30. The other end of this shaft 37 is provided with a lever 39 which is adapted to be engaged by the cam projections 40 on the wheel 19. 41 is a spring for retaining the rock shaft 37 in its normal or locking position.

In the foregoing description I have described a camera having the usual film rolls, but if desired, the device can readily be used in connection with a moving picture camera. In this case, the film is fed from any suitable source to a take-up device over the rolls 42, one of which is connected to a shaft 12ª which is similar to the shaft 12 in the other figures. This construction is diagrammatically shown in Fig. 5.

Figure 2:
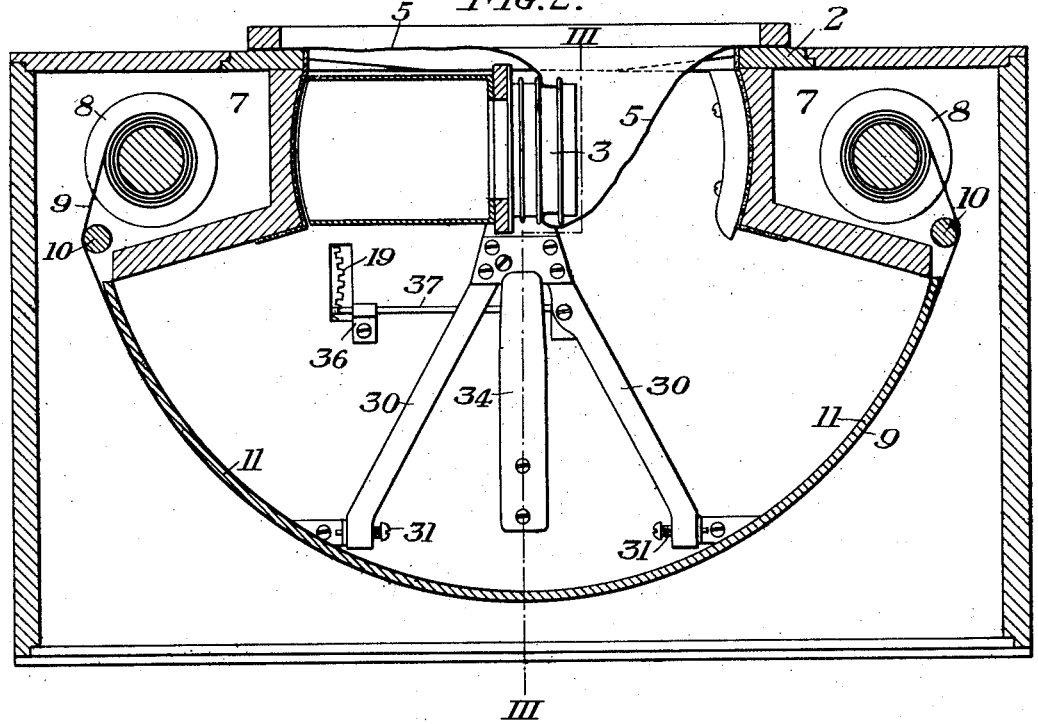
Fig. 2 is a sectional view on the line II—II of Fig. 3.

When the device is in use the film is fed from one spool 8 to the other spool 8 over the curved film guides 11, and is moved by the rotation of a shaft 12 as before described. During the rotation of this shaft 12, the gear wheel 19 will be rotated through the medium of the gear 18, which will shift the slide 27 from one extreme position to the other extreme position, and during its movement shift the spring 29 from one side of the center 24 to the other side of the center 24. This shifting of the spring 29 will place it in position to shift the lever 23 and rotate the lens carrier approximately 180° from the position shown in Fig. 2, and during the swing of the lens carrier that portion of the film supported by the guides 11 will be exposed. As the ratio of the pinion 18 and the gear 19 is approximately fourteen to one, there would be two exposures made for every fourteen revolutions of the shaft 12. The mechanism, as shown in Fig. 1, is in a position in which the lever 23 has just been shifted, and just before the gear wheel moves 180° from the position shown, the slide 27 will be shifted to the extreme left which will place the spring 29 in a position to draw the upper end of the lever 23 to the left. Shortly after this time one of the cams 40 on the wheel 19 will engage the lever 39 and rock the shaft 37. This rocking of the shaft 37 will cause the lever 38 to shift the locking lever 30 and remove the locking projection 32 from the locking opening 33, and permit the spring 29 to shift the lever 23. This shifting of the lever 23 will swing the lens carrier 3 approximately 180° and make the next exposure. As soon as the cam projection 40 passes the lever 39, the locking lever 30 will be moved into its locking position by the leaf spring 34 to lock the lever 23 against movement. The further rotation of the gear 19 will again shift the slide 27 to the position shown in the drawings, which will place the parts in position to move the lever 23 into the position shown in Fig. 1 after the lock is released.

The advantages of my invention will be apparent since I provide mechanism for feeding the film of a panoramic camera over the supporting guides therefor, together with means for periodically swinging the lens frame, which means is actuated by the film feeding means.

I claim:

1. A panoramic camera having a swinging lens frame, film feeding mechanism for feeding the film in one direction, and means actuated by the film feeding mechanism to periodically swing the lens frame back and forth across the exposed portion of the film, substantially as described.

2. A panoramic camera having a swinging lens frame, film feeding mechanism, means actuated by the film feeding mechanism to periodically swing the lens frame, and locking mechanism in timed relation with the film feeding mechanism and the mechanism for swinging the lens frame arranged to release the lens frame at periodical intervals, substantially as described.

3. A panoramic camera having a swinging lens frame, reciprocating gearing for swinging the lens frame, a spring for actuating said gearing, means for shifting said spring to oscillate the gearing, film feeding mechanism, and gearing connecting the film feeding mechanism and the spring actuating means, substantially as described.

4. A panoramic camera having curved film guides, means for feeding a film over said guides, a swinging lens carrier arranged to sweep across the film on the guides, mechanism for oscillating said lens carrier, and actuating connections between said oscillating mechanism and the film feed mechanism, substantially as described.

5. A panoramic camera having curved film guides, means for feeding a film over said guides, a swinging lens carrier arranged to sweep across the film on the guides, mechanism for oscillating said lens carrier, and actuating connections between said oscillating mechanism and the film feed mechanism, and a locking device for the oscillating mechanism, substantially as described.

6. A panoramic camera having curved guides for the film to be exposed, means for feeding said film over the guides, a swinging lens carrier arranged to sweep across the film on the guides, gearing for oscillating the lens carrier, actuating connections between the oscillating mechanism and the film feed for oscillating the lens carrier, a locking device for locking the oscillating mechanism in its two extreme positions, and means for periodically releasing said locking mechanism, substantially as described.

7. A panoramic camera having a swinging lens frame arranged to swing back and forth, film feeding mechanism for feeding the film in one direction across the path of the lens frame, means for continuously actuating the film feeding mechanism, and means actuated by the film feeding mechanism for periodically swinging the lens frame back and forth across the film, substantially as described.

In testimony whereof, I have hereunto set my hand.

JEHU FREDERIC HAWORTH.